V. BYMAN.
FRUIT GATHERER.
APPLICATION FILED JUNE 19, 1918.

1,385,111.

Patented July 19, 1921.

Witnesses

Inventor
V. Byman
H. J. Sanders
Atty.

By

UNITED STATES PATENT OFFICE.

VICTOR BYMAN, OF AMITY, OREGON.

FRUIT-GATHERER.

1,385,111.

Specification of Letters Patent.   Patented July 19, 1921.

Application filed June 19, 1918.   Serial No. 240,763.

*To all whom it may concern:*

Be it known that I, VICTOR BYMAN, a citizen of the United States, residing at Amity, in the county of Yamhill and State of Oregon, have invented certain new and useful Improvements in Fruit-Gatherers, of which the following is a specification.

This invention relates to improvements in fruit gatherers of that type adapted to surround the trunk of a fruit tree to break the fall of the fruit dropping therefrom and to deposit the same in receptacles provided therefor.

A further object is to provide a fruit gatherer provided with adjustable legs that will permit it to be raised or lowered with relation to the ground line.

With the foregoing and other objects in view the invention consists in the combination and arrangement of parts to be hereinafter fully described, pointed out in the appended claim and illustrated in the accompanying drawing which forms a part of this specification and in which—

Like reference characters denote corresponding parts throughout the several views.

Figure 1:
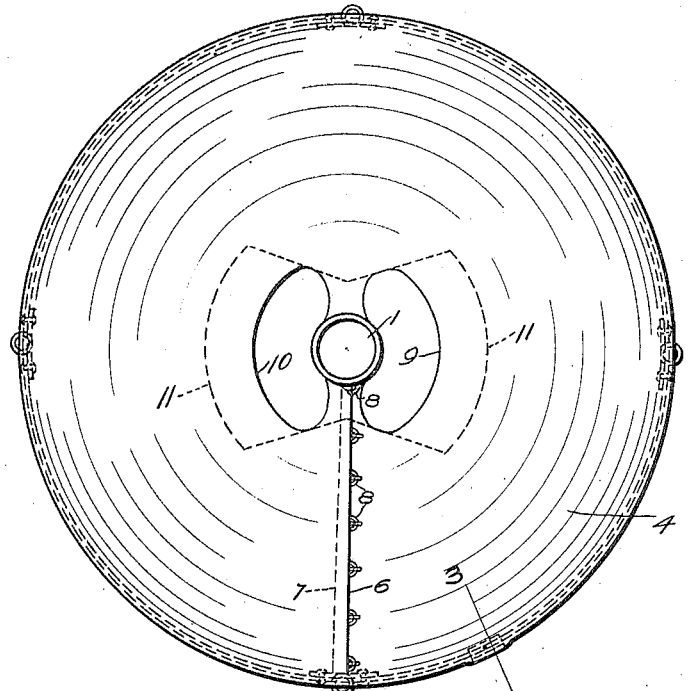
Figure 1 is a top plan view of my improved fruit gatherer.
Figure 3:
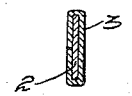
Fig. 3 is a cross section taken on line 3—3 of Fig. 1.
Figure 4:
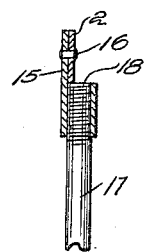
Fig. 4 is a detail sectional view illustrating the means of attaching and adjusting the supporting legs.
Figure 2:
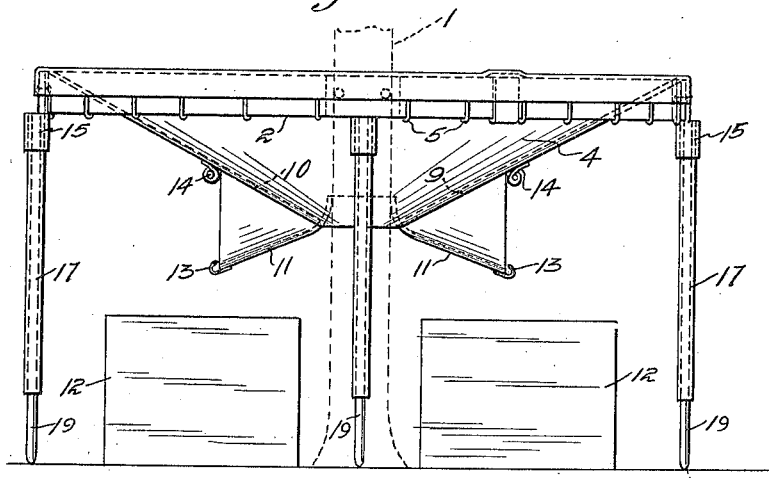
Fig. 2 is a view of the same in side elevation.

The reference numeral 1 denotes the trunk of a tree about which it is desired to arrange my fruit gatherer. The gatherer comprises a circular frame 2 formed of a single metal band the ends of which are brought together and bound or locked by a metal strap 3. To the frame 2 I secure a canvas basket 4 by means of the hooks 5, the edge of the said canvas basket passing over the upper edge of the frame 2, said canvas basket being formed with a slit which is closed by having its edges 6, 7 overlapped and secured together with hooks and eyes 8. The basket is also formed with the oppositely disposed openings 9, 10 and with the canvas chutes 11 disposed beneath said openings 9, 10 and adapted to receive the fruit that drops into the basket and passes through the said openings, and to deposit it in suitable receptacles 12 arranged upon the ground beneath said chutes. Hooks 13 carried by said chutes are adapted for engagement with the eyes 14 carried by the basket to permit the chutes to be closed when desired.

To the frame 2 I secure the threaded sleeves 15 by means of the rivets 16, said sleeves adjustably carrying the legs 17 formed upon their upper ends with the threads 18. The said legs 17 are tubular and carry the rods 19 that rest directly upon the ground. The canvas edges 6, 7 are unfastened when it is desired to apply the gatherer to a tree or to remove it therefrom. The canvas covering the upper edge of the frame 2 protects the same and tends to lessen the injury to such fruit as may fall upon the frame instead of within the same. The legs 17 being adjustable it is possible to position the chutes 11 any distance above the receptacles 12 desired.

What is claimed is:—

In a fruit gatherer, a circular frame formed of a single piece of material having its meeting edges strapped together, legs adjustably supporting said frame, a basket formed of flexible material having its outer edge secured to said frame and overlapping the same, the bottom of said basket sloping downwardly from its outer edge to its central portion, said basket being formed with a normally closed slit and with oppositely disposed central openings, oppositely disposed flexible chutes secured to said basket below the central openings therein and upon opposite sides of the center of the basket, said chutes opening in opposite directions, each chute in open position sloping downwardly in a direction opposite to the slope of the bottom side of the basket to which it is secured, each of said chutes in raised position being adapted to close one of said central openings, and means for retaining said chutes individually in raised position.

In testimony that I claim the foregoing as my own I have hereto affixed my signature in the presence of subscribing witnesses.

VICTOR BYMAN.

Witnesses:
ALFRED OLKE,
ALFRED TUPPER,
B. A. KLIKS.